United States Patent [19]

Reinhardt et al.

[11] 4,100,251

[45] Jul. 11, 1978

[54] METHOD OF RECOVERING METALS OUT OF SOOT ORIGINATING FROM THE COMBUSTION OF OIL

[75] Inventors: Nils Reinhardt; Ulf Vilhelm Kuylenstierna, both of V:a Frölunda; Bengt Agne Alfredsson, Stenungsund, all of Sweden

[73] Assignee: Sotex AB, Molndal, Sweden

[21] Appl. No.: 785,536

[22] Filed: Apr. 7, 1977

[30] Foreign Application Priority Data

Apr. 20, 1976 [SE] Sweden ................................ 7604527

[51] Int. Cl.$^2$ ...................... C01G 49/00; C01G 53/00; C01G 31/00
[52] U.S. Cl. ........................................ 423/63; 423/62; 423/68; 423/1; 423/138; 423/139; 423/150; 75/101 BE
[58] Field of Search ...................... 423/62, 63, 67, 68, 423/138, 139, 150; 75/101 R, 115

[56] References Cited

U.S. PATENT DOCUMENTS

| | | |
|---|---|---|
| 1,570,170 | 1/1926 | Obeile ..................................... 423/68 |
| 2,211,119 | 8/1940 | Hixson et al. ........................... 423/63 |
| 2,920,936 | 1/1960 | Dille et al. .............................. 423/68 |
| 3,416,882 | 12/1968 | Whigham ................................ 423/68 |
| 3,615,167 | 10/1971 | Berthoux et al. ....................... 423/67 |
| 3,700,415 | 10/1972 | Koerner et al. ........................ 423/63 |
| 3,966,569 | 6/1976 | Reinhardt et al. .................... 423/139 |
| 3,975,495 | 8/1976 | Bowerman .............................. 423/65 |

Primary Examiner—Herbert T. Carter
Attorney, Agent, or Firm—Burns, Doane, Swecker & Mathis

[57] ABSTRACT

Soot produced in the combustion of fuel oil contains valuable metals, such as vanadium and nickel. The soot can be disposed of, and the valuable metals can be recovered, by leaching the soot with an aqueous solution of sulphuric acid, to extract part of the metal content from the soot, combusting the soot thus leached, and leaching the combustion residue with an aqueous solution of sulphuric acid, to extract an additional part of the metal content. The solution produced in this second leaching process is preferably returned to the leaching of the soot. Metals can be recovered in a way known per se from the solution produced in the leaching of the soot.

6 Claims, 1 Drawing Figure

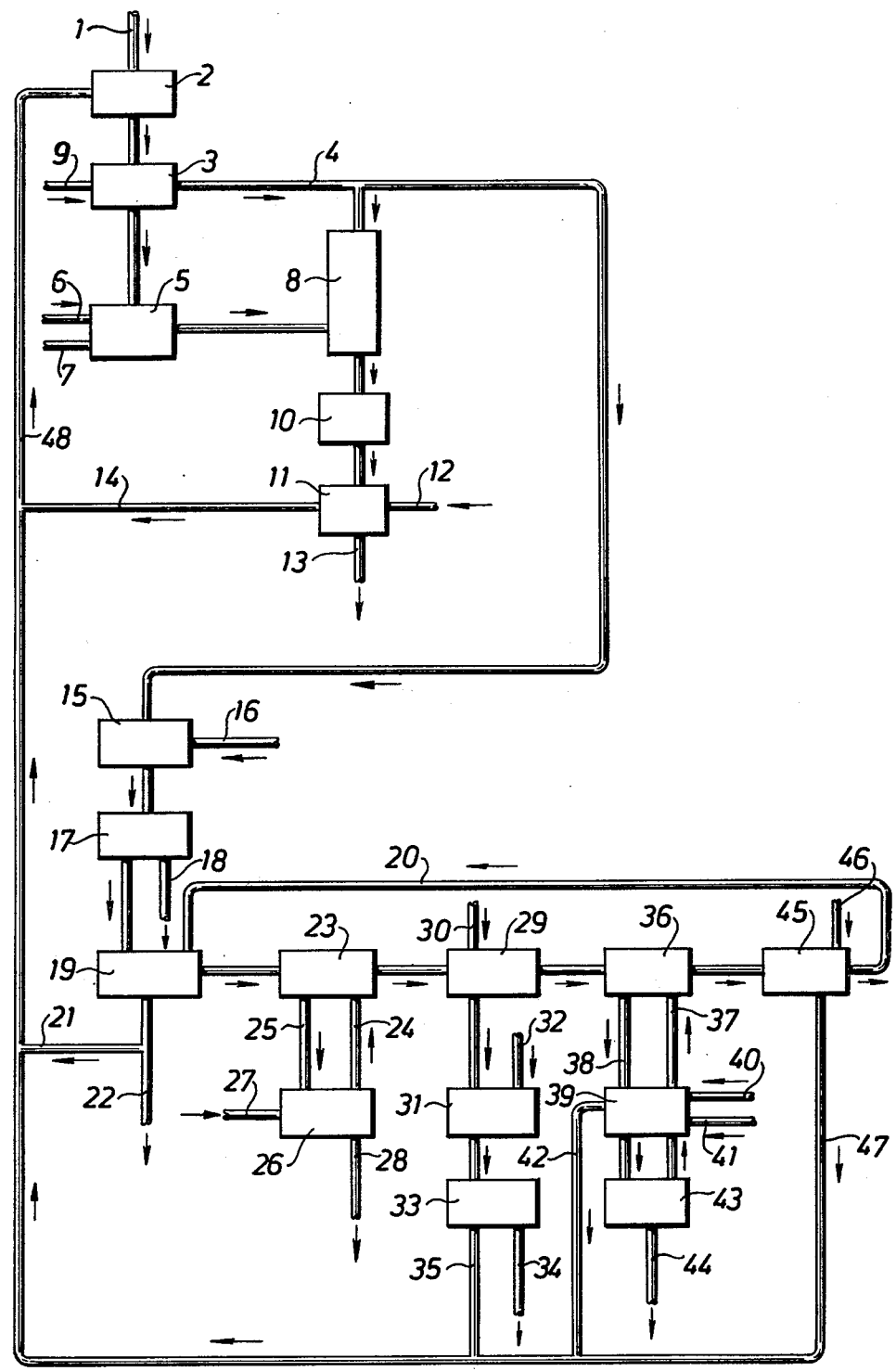

METHOD OF RECOVERING METALS OUT OF SOOT ORIGINATING FROM THE COMBUSTION OF OIL

The invention relates to a method of recovering metals out of soot from the combustion of oil by leaching the soot and recovering the metals from the leaching solution. It is known that soot from oilfired power stations and district heating plants contains a number of metals, such as 5–20% vanadium, 1–2% iron and 0.1 – 10% nickel, as well as carbon and sulphur. Attempts have been made to recover these metals by leaching the soot, but it has been found that a considerable proportion of the metal content is so firmly linked with the soot that it is extremely difficult to leach out. Attempts have also been made to burn the soot and to leach the metals out of the solid combustion residue. These attempts have not been successful due to the excessive corrosion caused in the combustion apparatus.

According to the invention it has been found that metals, particularly vanadium, can be recovered from soot with very satisfactory yield. The method of the invention comprises leaching the soot with an aqueous solution of sulphuric acid at a pH-value of 1–2, to extract some of the metal content from the soot, combusting the soot thus leached in a furnace at 600°–1200° C, and leaching the combustion residue with an aqueous solution of sulphuric acid at a pH-value of 0–2, to extract more of the metal content of the soot. An additional advantage with this method is that the final leaching residue is obtained in such small quantities and in such condition that it can easily be disposed of. Another advantage is that the natural content of sulphur in the soot in the form of $SO_3$ is utilized for the leaching, which therefore only requires a small quantity of sulphuric acid.

The invention will now be described with reference to the drawing which shows a flow chart for leaching soot and recovering metals out of the leaching solution by means of liquid-liquid extraction.

Soot is supplied at 1 to a leaching vessel 2 which also receives a water solution of sulphuric acid through a pipe 48. The pH value in that tank is 1–2. The temperature is suitably 20° – 95° C, and the leaching time is suitably 5 – 50 hours. The added liquid contains sodium sulphate, $Na_2SO_4$, in a quantity of 50 – 100 g/l. Due to buffer action the sodium sulphate tends to keep the pH value at about 1.3, which is favourable for leaching out vanadium. In spite of this the vanadium is not leached out completely. Depending on the origin of the soot 10 – 90% of the vanadium content is leached out.

The soot is separated from the leaching solution in a filter 3 and washed with water supplied through a pipe 9. The soot has now been freed from most of its sulphur content. It is burned in a furnace 5 at 600° – 1200° C. Combustion air is supplied to the furnace through a pipe 6. Oil may be added through a pipe 7, if the soot is unable to maintain combustion due to high water content. The flue gas and flying ash from the combustion are led to a scrubber 8 where they are washed with some of the leaching solution leaving the filter 3 through a pipe 4. The mixture of leaching solution and solid combustion residue leaving the scrubber 8 is led to a leaching vessel 10 where leaching occurs at a pH value 0 – 2 for a period of 1 – 50 hours. The majority of the vanadium is now extracted from the combustion residue. In all 90 – 100% of the vanadium content in the soot is leached out in the two leaching steps in 2 and 10. The solid leaching residue is separated in a filter 11 and washed with water supplied through a pipe 12. The remainder is removed at 13 for disposal, while the leaching solution and the washing water leave through a pipe 14 and are returned through conduit 48 to the leaching vessel 2.

The remainder of the leaching solution from the filter 3 shall now be subjected to liquid-liquid extraction. However, it may be advisable first to increase the pH value somewhat. Calcium carbonate is thus added at 16 to the leaching solution in the container 15, in such a quantity that the pH value is increased to 1.5 – 2.5. Pure calcium sulphate, or calcium sulphate and iron in the form of jarosite, ferric hydroxide or goethite, is then precipitated, depending on the pH-value and temperature. The precipitate is separated in a filter 17 and is removed at 18 for disposal or sale.

The filter solution is led to an extraction apparatus 19 of mixer-settler type where it is mixed with an organic extraction liquid supplied through a conduit 20. This liquid consists of, or contains, a reactant which in known manner can extract the most important metals from the soot, i.e. vanadium and iron. A suitable extraction liquid contains 5 – 50% diethylhexylphosphoric acid, 0 – 30% tributylphosphate and 20 – 65% kerosene as solvent. After mixing, the two phases are allowed to separate in the apparatus 19. The water phase, which has lost 50 – 99% of its vanadium content and 10 – 30% of its iron content, leaves through a pipe 21 to the pipe 48 and is used for renewed leaching of soot. A small part of the water phase is removed from the system through a pipe 22 to prevent impurities from becoming too concentrated in the circulating water phase. The organic phase is conducted to a mixer-settler 23 where it is washed with a weak water solution of sulphuric acid which is added through a pipe 24. The solution is preferably 0.05 – 0.5 M. This washing process removes the small quantities of calcium which have accompanied the organic phase. After separation of the phases the water phase is led to a filter 26 where calcium sulphate is separated and removed at 28. After the addition of sulphuric acid at 27, the solution is returned through conduit 24 to apparatus 23.

The organic phase is led to a mixer-settler 29 where it is mixed with sulphuric acid, concentration 1 – 3 M, which is added at 30. The vanadium then passes to the water phase which will contain approximately 40 – 60 g/l vanadium. The water phase is led to a precipitation vessel 31 where soda is added at 32. This result is vanadium being precipitated, probably in the form of $VO_2 \cdot nH_2O$. The precipitate is separated in a filter 33 and removed at 34. The filtrate contains sodium sulphate and is suitably led through a pipe 35 to the pipe 48 to be supplied to the leaching vessel 2.

The organic phase from the apparatus 29 is led to a mixer-settler 36 where it is mixed with sulphuric acid, concentration 4 – 6 M, which is added through a pipe 37. Iron then passes to the water phase and this is carried by a pipe 38 to a container 39. Sulphuric acid is added at 40 and $SO_2$, for instance in the form of a sulphurous flue gas, at 41. The trivalent iron in the water solution is thus reduced to divalent, after which the solution is returned to apparatus 36. Since the iron is now in divalent form, a high iron content, preferably 40 – 60 g/l, can be maintained in the solution circulating between apparatus 36 and the reduction vessel 39. Iron shall be removed from this circulating solution. The drawing shows that this can be done in two ways. Some of the solution from the reduction vessel 39 can be carried via a pipe 42 to the pipe 48 to be used for renewed leaching of soot in vessel 2. Alternatively, the solution from the reduction vessel 39 may be caused to circulate through a crystallization vessel 43 where it is cooled, resulting in the precipitation of ferrosulphate which is removed at 44.

The organic phase from apparatus 36 is led to a mixer-settler 45 where it is mixed with water supplied at 46. The organic phase is thus freed from sulphuric acid and is then returned via the pipe 20 to renewed extraction in apparatus 19. The acid water phase is carried via a pipe 47 to the pipe 48 to be used for the leaching in vessel 2.

EXAMPLE

Soot was separated from the exhaust gas in an oil-heated power plant. The soot contained:

|   | V | Fe | Ni | C | $SO_4^{2-}$ |
|---|---|---|---|---|---|
| % | 5 | 6 | 2 | 70 | 12 |

1000 kg of this soot was dispersed in 2100 l of an aqueous solution containing:

|   | V | Fe (II) | Ni | $SO_4^{2-}$ |
|---|---|---|---|---|
| g/l | 5 | 4.5 | 11 | 236 |

The aqueous solution had a pH of 0.7. The dispersion was kept stirred for 24 hours, and was subsequently filtered. After having been washed with water, the wet filter residue weighed 2140 kg. It contained 35%, i.e. 750 kg, solids containing:

|   | V | Fe | Ni | C |
|---|---|---|---|---|
| % | 2.0 | 2.4 | 0.8 | 90 |

This filter residue was fed into a furnace where it was combusted at 700° –900° C. The ashes from the combustion weighed 80 kg and contained:

|   | V | Fe | Ni | C |
|---|---|---|---|---|
| % | 18 | 22.4 | 7.4 | 3.1 |

These ashes were mixed with 2100 of filtrate from the filtration process, containing:

|   | V | Fe | Ni | $SO_4^{2-}$ |
|---|---|---|---|---|
| g/l | 20.7 | 23.4 | 16.7 | 280 |

The mixture was heated to 90 – 100° C by being contacted with the hot exhaust gas resulting from the combustion of the soot. Finely ground calcium carbonate was added in a quantity to give the mixture a pH of 0.8 – 1.2. The mixture was kept stirred for 24 hours, and was subsequently filtered. After having been washed with water the wet filter residue weighed 332 kg. It contained 50%, i.e. 166 kg, solids containing:

|   | V | Fe | Ni | $CaSO_4$ |
|---|---|---|---|---|
| % | 1.5 | 34.5 | 1.1 | 35.0 |

The filtrate, approximately 2100 l, contained:

|   | V | Fe | Ni | $SO_4^{2-}$ |
|---|---|---|---|---|
| g/l | 27.6 | 5.7 | 19.5 | 252 |

This filtrate was cooled to 30° C, and sulphur dioxide, $SO_2$, was now added in a quantity enough for reducing the whole vanadium content into tetravalent vanadium, and the whole iron content into divalent iron. The solution was now diluted with water to a volume of 2300 l. The resulting solution contained:

|   | V | Fe | Ni | $SO_4^{2-}$ |
|---|---|---|---|---|
| g/l | 25.2 | 5.2 | 17.8 | 230 |

This solution was contacted with a solution of kerosene ("Nysolvin HF") containing 20% di(2-ethylhexyl)-phosphoric acid and 15% tributyl phosphate. The contacting process was performed as a continuous counter-current liquid-liquid extraction process in four steps. More than 80% of the vanadium, and less than 10% of the iron, were transferred from the aqueous solution to the kerosene solution.

The major quantity of the raffinate, i.e. the aqueous solution depleted of vanadium, was returned to be used as leaching acid in the soot leaching process. A minor quantity of 238 l was removed from the process as a bleed, to prevent a high concentration of impurities in the raffinate.

The metal-containing kerosene solution was contacted with 925 l aqueous solution of sulphuric acid, having a concentration of 1.5 M. The contacting process was performed as a counter-current liquid-liquid extraction process in two steps. The entire quantity of vanadium, and part of the iron, was transferred (re-extracted) to the aqueous liquid, producing an aqueous solution containing 50 g/l vanadium, 1.5 g/l iron, and 0.5 M free sulphuric acid.

The kerosene solution was subsequently washed with 143 l sulphuric acid, having a concentration of 6 M, in one washing step. The resulting quantity of iron in the kerosene was transferred to the sulphuric acid, giving the sulphuric acid a content of Fe (III) of 10 g/l. This solution was used for preparing the sulphuric acid solution to be used in the vanadium re-extraction process.

The kerosene solution was finally washed with water, for the purpose of washing out sulphuric acid from the kerosene. The aqueous solution leaving this washing operation consisted of 233 l sulphuric acid solution having a concentration of 2 M. Also this solution was used for preparing the sulphuric acid solution to be used in the vanadium re-extraction process.

The kerosene solution leaving this washing process was returned to be used again in the vanadium extraction process.

What is claimed is:

1. A process for recovering at least one metal selected from the group consisting of iron, nickel and vanadium which is contained in the soot which results from the combustion of oil, comprising (a) leaching the soot with an aqueous solution of sulphuric acid at a pH of from about 1 to about 2, to extract some of the total metal content from the soot, (b) combusting the leached soot in a furnace at a temperature of from about 600° to about 1200° C, and (c) further leaching the combustion residue with an aqueous solution of sulphuric acid at a pH of from about 0 to about 2, so as to extract more of the metal from the soot and (d) recovering said metal from the leaching solution.

2. The process of claim 1, wherein flue gas which is produced from the combustion of the soot is washed with part of the leaching solution obtained from the leaching of the soot, and wherein said combustion residue is leached with the liquid produced by the washing process.

3. The process of claim 1 wherein the leaching solution produced by the leaching of the combustion residue is returned for use in the leaching of soot.

4. The process of claim 1, wherein the soot is leached with a solution of sulphuric acid which also contains from about 50 to about 100 g/l $Na_2SO_4$.

5. The process of claim 1 wherein the metal is vanadium.

6. The process of claim 1 wherein the metal is recovered from the leaching solution by means of a liquid-liquid extraction.

* * * * *